United States Patent
Vieux (10) Patent No.: US 10,606,265 B2
(45) Date of Patent: Mar. 31, 2020

(54) METHOD OF CONTROLLING AT LEAST ONE ACTUATOR FOR CONTROLLING AN AIRCRAFT, AN ASSOCIATED CONTROL SYSTEM, AND A CORRESPONDING AIRCRAFT

(71) Applicant: AIRBUS HELICOPTERS, Marignane (FR)

(72) Inventor: Thierry Vieux, Carry le Rouet (FR)

(73) Assignee: AIRBUS HELICOPTERS, Marigane (FR)

( * ) Notice: Subject to any disclaimer, the term of this patent is extended or adjusted under 35 U.S.C. 154(b) by 0 days.

(21) Appl. No.: 16/199,454

(22) Filed: Nov. 26, 2018

(65) Prior Publication Data

US 2019/0163179 A1     May 30, 2019

(30) Foreign Application Priority Data

Nov. 30, 2017  (FR) ..................... 17 71295

(51) Int. Cl.
  *G05D 1/00*  (2006.01)
  *G05B 9/03*  (2006.01)
  *B64C 13/40*  (2006.01)
  *B64C 13/50*  (2006.01)

(52) U.S. Cl.
  CPC .......... *G05D 1/0077* (2013.01); *B64C 13/40* (2013.01); *B64C 13/50* (2013.01); *G05B 9/03* (2013.01)

(58) Field of Classification Search
  CPC .......... B64C 13/40; B64C 13/50; G05B 9/03; G05D 1/0077
  See application file for complete search history.

(56) References Cited

U.S. PATENT DOCUMENTS

| | | |
|---|---|---|
| 3,764,095 A | 10/1973 | Schenbeck |
| 2013/0124019 A1* | 5/2013 | Fukui ................ G05D 1/0077 701/3 |

FOREIGN PATENT DOCUMENTS

| | | | |
|---|---|---|---|
| DE | 3225724 A1 * | 1/1984 | ........ G05D 1/0077 |
| DE | 3225724 A1 | 1/1984 | |
| EP | 2595023 A2 | 5/2013 | |
| EP | 2595023 A3 | 3/2015 | |

OTHER PUBLICATIONS

English translation for reference DE3225724 (Year: 1984).*
French Search Report for Application No. 1771295, Completed by the French Patent Office, dated Jul. 27, 2018, 7 pages.

* cited by examiner

*Primary Examiner* — Rachid Bendidi
(74) *Attorney, Agent, or Firm* — Brooks Kushman P.C.

(57) ABSTRACT

A method of controlling at least one actuator for controlling an aircraft. The method comprises data acquisition steps performed using at least two mutually distinct sensors, the sensors being suitable for taking mutually distinct measurements of at least one flight parameter of the aircraft. Calculation steps generate at least two mutually distinct control laws for controlling the actuator(s). The control laws are functions of the respective measurements. The method controls the actuator(s) sequentially with a first control law in alternation with a second control law.

18 Claims, 4 Drawing Sheets

METHOD OF CONTROLLING AT LEAST ONE ACTUATOR FOR CONTROLLING AN AIRCRAFT, AN ASSOCIATED CONTROL SYSTEM, AND A CORRESPONDING AIRCRAFT

CROSS-REFERENCE TO RELATED APPLICATIONS

This application claims priority to French patent application No. FR 1771295 filed on Nov. 30, 2017, the disclosure of which is incorporated in its entirety by reference herein.

BACKGROUND OF THE INVENTION (1) Field of the Invention

The present invention relates to the field of controlling aircraft by means of at least one actuator. By way of example, such actuators may comprise hydraulic jacks, servo-controls, or electric motors that serve to control the attitude and the path of the aircraft relative to three main axes, namely a yaw axis enabling the aircraft to pivot, a pitching axis enabling the aircraft to pitch up or down, and a roll axis enabling left/right inclination of the aircraft to be modified, and also the vertical axis for maintaining the height of the flight.

(2) Description of Related Art

By way of example, such actuators can also act on flaps or slats to increase or reduce the lift of a wing of the aircraft, and on air brakes in order to increase or reduce the drag of the aircraft.

In addition, in the particular situation where the aircraft to be controlled is a drone of the multirotor type, such actuators may also be formed directly by electric motors. Such electric motors are motors having a variable speed of rotation and they are then controlled in order to drive rotation of the various rotors constituting a rotary wing that serves in particular to provide the aircraft with lift, and also to determine its attitude, as defined by the pitch and roll attitude angles of the aircraft, thereby enabling the path of such an aircraft to be controlled.

In general manner, while piloting an aircraft, on-board sensors serve to measure flight parameters. Such flight parameters may in particular be attitudes, speeds, or accelerations of the aircraft along the three main axes. These flight parameter measurements are transmitted to calculation means serving to manage control setpoints for the actuator(s), used to control the aircraft in compliance with at least one control law.

Furthermore, in order to control certain aircraft that require control means to have redundancy, and as described in particular in Document EP 2 595 023, it is also known to make use of at least two calculation means or processors serving to generate two mutually distinct control laws in parallel. Thus, if one of the control means or processors fails, a backup control means/processor can take over and generate the control law used for controlling the actuator.

Nevertheless, in order to achieve such redundancy in the control of the actuator, the at least two calculation means or processors need to be mutually synchronized in terms of their calculation clocks, and they also need to exchange proportional, derivative, and/or integral correction data for application to the signal derived from a control setpoint in order to control one or more actuators. Such synchronization of calculation means is very complex to achieve in practice and requires sophisticated synchronization means and calculation means that are unusual in that they are capable of mutually communicating information about real time variations of the flight parameters. Document U.S. Pat. No. 3,764,095 describes such means for synchronizing data between two sophisticated calculation means.

Furthermore, it is clear that the greater the number of calculation means included in a control system for generating control laws in parallel, the more difficult it becomes to synchronize them.

Furthermore, and as described in Document DE 32 25 724, a method is also known of remotely monitoring steering commands for a passenger vehicle such as a bus. In addition, that method describes using two mutually distinct control channels, one acting on the steering in the vehicle while the other is available on standby.

In addition, in order to obtain operational availability of both channels, provision is made only for the active channel and the standby channel to be swapped over periodically, and for this to be done with a short cycle time.

BRIEF SUMMARY OF THE INVENTION

An object of the present invention is thus to propose a method of controlling at least one actuator that enables the above-mentioned limitations to be avoided. Such a control method is advantageous since it serves specifically to achieve synchronization of correction time constants very simply between at least two calculation means generating control laws for an actuator. In addition, such synchronization of the information can be obtained without the calculation means needing to exchange data or to synchronize their internal clocks.

Consequently, such a control method and the associated control system can be implemented by using calculation means or processors that are simple and inexpensive so as to generate a plurality of control laws in parallel. Such a control method can thus provide a solution that is simple and inexpensive for providing redundancy, asymmetry of design, and/or asymmetry of implementation in the control in the event of a failure or of an error being detected for one of the calculation means.

Furthermore, such a control method is simple to implement as a result of each control law being of independent design, since it consists in using conventional calculation means that are not mutually synchronized. Thus, the calculation means that are used can be replaced very quickly without requiring additional stages of design and/or programming, e.g. if the calculation means are no longer available or if a problem of reliability has been identified in one of them.

The invention thus provides a method of controlling at least one actuator for controlling an aircraft, the method comprising:

data acquisition steps performed using at least two mutually distinct sensors S1, S2, the sensors S1, S2 being suitable for taking mutually distinct measurements P1, P2 of at least one flight parameter of the aircraft; and calculation steps for generating at least two mutually distinct control laws L1, L2 for controlling the actuator(s), the control laws L1, L2 being functions of the respective measurements P1, P2.

According to the invention, such a method is remarkable in that it controls the actuator(s) sequentially with a first control law L1 in alternation with a second control law L2, the control method including at least two regulation loops B1, B2 for controlling the actuator(s), a first regulation loop B1 implementing the first control law L1 and a second regulation loop B2 implementing the second control law L2, the first regulation loop B1 being closed sequentially while the second regulation loop B2 is open, and conversely the first regulation loop B1 being open sequentially while the second regulation loop B2 is closed.

The concept of a closed loop, in the process control meaning, indicates that the first/second control law L1/L2 controls the actuator(s) and receives in return via its sensor S1/S2 the measurements P1/P2 that result from the effect of the first/second control law L1/L2 on the aircraft.

The concept of an open loop, in the process control meaning, indicates that the first/second control law L1/L2 does not control the actuator(s), but nevertheless receives in return from its sensors S1/S2 the measurements P1/P2 that come from the effect of the other control law L2/L1 acting in a closed loop on the aircraft.

In other words, calculation steps are performed in parallel and the regulation loops B1, B2 are open and closed in alternation and cyclically by virtue of the measurements P1, P2 of the flight parameter(s) taken by the sensors S1, S2.

The actuator(s) is/are thus controlled sequentially, and in repeated manner such as a loop, by the first control law L1 and by the second control law L2, e.g. making it possible to synchronize the time constants and the gains of the respective correctors of the first regulation loop B1 and of the second regulation loop B2.

Furthermore, sequential control of the actuator(s) with the first control law L1 in alternation with the second control law L2 continues to be performed cyclically one law after the other so long as no fault or error is detected on either of the sensors S1, S2 and/or on either of the calculation means serving to generate respective ones of the two control laws L1, L2.

In addition, such sequential control makes it possible to use electronic components of different kinds and/or technologies for generating the first control law L1 and the second control law L2. Such non-similarity of the electronic components is advantageous in terms of safety and reliability, since it avoids the potential for a common failure over the entire control method.

Advantageously, the method may comprise:

data acquisition steps performed from at least three mutually distinct sensors S1, S2, S3, the sensors S1, S2, S3 being suitable for taking mutually distinct measurements P1, P2, P3 of at least one flight parameter of the aircraft;

calculation steps for generating at least three mutually distinct control laws L1, L2, L3 for controlling the actuator(s), the control laws L1, L2, L3 being functions of the respective measurements P1, P2, P3; and a first selection step for selecting at least two control laws L1, L2 from among control laws L1, L2, L3.

The method can then control the actuator(s) sequentially with the first control law L1 in alternation with the second control law L2, with a third control law L3 that is a function of the measurements P3 of the flight parameter(s) of the aircraft being excluded from the sequential control of the actuator(s).

In other words, the control method can also detect an error in one of the three control laws L1, L2, and L3 and then cease to use that third control law L3 in the sequential control of the actuator(s). Such an error in the third control law L3 may be generated in particular as a result of a failure of the sensor S3 or indeed it may be due to a failure or a calculation error in the calculation means. Such a calculation failure may in particular be detected by a "watchdog" type computer system, which may advantageously be incorporated in the various microcontrollers and the mother cards dedicated to the various calculation steps being generated in real time.

In practice, the control laws L1, L2, L3 generate at least three control setpoints C1, C2, C3 simultaneously for controlling the actuator(s), and the control method includes at least:

a first calculation step for calculating a first mean control setpoint value M1, the first mean value M1 being calculated by taking an arithmetic mean of the control setpoints C1, C2, C3;

a second calculation step for calculating at least three setpoint differences $\Delta 1, \Delta 2, \Delta 3$, the setpoint differences $\Delta 1, \Delta 2, \Delta 3$ being calculated as being the difference between the mean value M1 and the control setpoints C1, C2, C3 respectively; and a first comparison step for comparing the setpoint differences $\Delta 1, \Delta 2, \Delta 3$ respectively with a first predetermined threshold value V1.

The first selection step for selecting at least two control laws L1, L2 from among the control laws L1, L2, L3 is a function of the results obtained from the first comparison step between the setpoint differences $\Delta 1, \Delta 2, \Delta 3$ and the first predetermined threshold value V1, the control laws L1, L2 being selected if the setpoint differences $\Delta 1, \Delta 2$ are both less than the first predetermined threshold value V1.

Under such circumstances, the first selection step serves to select the control laws L1 and L2 and to exclude the third control law L3 if the setpoint difference $\Delta 3$ is greater than the first predetermined threshold value V1. Specifically, such a setpoint difference $\Delta 3$ for the setpoint C3 compared with the first mean value M1 may be indicative of a failure or an error in the corresponding calculation means serving to generate the third control law L3, or else a failure of the sensor S3.

Advantageously, such a method may comprise a third calculation step for calculating a second mean value M2 of the measurements of at least one flight parameter of the aircraft, the second mean value M2 being calculated by taking an arithmetic mean of the measurements P1, P2, P3;

a fourth calculation step for calculating at least three measurement differences $\delta 1, \delta 2, \delta 3$, the measurement differences $\delta 1, \delta 2, \delta 3$ being calculated as being the difference between the second mean value M2 and the measurements P1, P2, P3 respectively; a second comparison step for comparing the measurement differences $\delta 1, \delta 2, \delta 3$ with a second predetermined threshold value V2; and a second selection step for selecting at least two sensors S1, S2 from among the sensors S1, S2, S3 as a function of the respective results obtained in the second comparison step between the measurement differences $\delta 1, \delta 2, \delta 3$ and the second predetermined threshold value V2, the sensors S1, S2 being selected if the measurement differences $\delta 1, \delta 2$ are both less than the second predetermined threshold value V2.

Under such circumstances, the second selection step serves to select the control laws L1 and L2 and to exclude the third control law L3 if the measurement difference $\delta 3$ is greater than the second predetermined threshold value V2. Specifically, such a measurement difference $\delta 3$ for the measurement P3 compared with the second mean value M2 may be representative of a failure of the sensor S3.

In an advantageous implementation of the invention, the first control law L1 may control the actuator(s) for a first predetermined duration T1 and the second law L2 may control the actuator(s) for a second predetermined duration T2.

Thus, once the first predetermined duration T1 has elapsed, the control method serves to control the actuator(s) with the second control law L2 being selected. Likewise, once the second predetermined duration T2 has elapsed, the control method can then control the actuator(s) once more with the first control law L1 being selected.

In addition, if a third control law L3 is excluded by the control method, then the second predetermined duration T2 during which the second control law L2 is implemented may be distinct from the first predetermined duration T1.

Nevertheless, in another implementation of the invention, the first predetermined duration T1 may equally well be equal to the second predetermined duration T2.

Such equality between the first predetermined duration T1 and the second predetermined duration T2 may be implemented in particular by the control method when all three control laws L1, L2, and L3 are selected and consequently each of the three control laws L1, L2, and L3 controls the actuator(s) sequentially.

Advantageously, at least one of the first and second predetermined durations T1, T2 lies in the range 100 milliseconds (ms) to 1 second (s).

Specifically, such a range of values for at least one of the first and second predetermined durations T1 and T2 is advantageous since it is long enough to enable the control method to perform each of the various steps making it up, to converge, and to stabilize its corrector, and short enough to ensure that no drift occurs between the various correctors of the regulation loops B1, B2.

As mentioned above, the invention also provides a control system for controlling at least one control actuator of an aircraft in order to implement the method as described above.

Thus, according to the invention, such a system is remarkable in that it comprises:

at least two mutually distinct sensors S1, S2 suitable for taking mutually distinct measurements P1, P2 of at least one flight parameter of the aircraft;

at least two mutually distinct calculation means N1, N2 suitable for generating at least two mutually distinct control laws L1, L2 for controlling the actuator(s), the control laws L1, L2 being functions of the respective measurements P1, P2;

at least one sequential control device for controlling the actuator(s) with a first control law L1 generated by first calculation means N1 in alternation with a second control law L2 generated by second calculation means N2; and at least two regulation loops B1, B2 for controlling the actuator(s), a first regulation loop B1 implementing the first control law L1 and a second regulation loop B2 implementing the second control law L2, the first regulation loop B1 being closed sequentially while the second regulation loop B2 is open, and conversely the first regulation loop B1 being open sequentially while the second regulation loop B2 is closed.

In other words, the sequential control device(s) serve(s) to close and open the regulation loops B1 and B2 in alternation in order to control the actuator(s). Such sequential control device(s) may in particular be formed by a cyclic computer program having memory for storing the various predetermined durations during which the regulation loops B1, B2 are respectively to be open and then closed.

The sequential control device(s) thus serve(s) to control the actuator(s) in succession by means of the first control law L1 and then by means of the second control law, e.g. in order to synchronize the time constants and the gains of the respective correctors of the first regulation loop B1 and of the second regulation loop B2.

In practice, the system may comprise:

at least three mutually distinct sensors S1, S2, S3 suitable for taking mutually distinct measurements P1, P2, P3 of flight parameter(s) of the aircraft;

at least three mutually distinct calculation means N1, N2, N3 suitable for generating at least three mutually distinct control laws L1, L2, L3 for controlling the actuator(s), the control laws L1, L2, L3 being functions of the measurements P1, P2, P3 respectively; and at least one selector device for selecting at least two control laws L1, L2 from among the control laws L1, L2, L3.

Furthermore, the sequential control device(s) may control the actuator(s) sequentially with the control law(s) L1 in alternation with the second control law L2, a third control law L3 that is a function of the measurements P3 of the flight parameter(s) of the aircraft being excluded from the sequential control of the actuator(s).

In other words, such a control system also makes it possible to identify an error in one of the control laws L1, L2, L3, and then by using the selector device(s), to exclude that control law L3 from the sequential control of the actuator(s). Such an error in the third control law L3 may be generated in particular as a result of a failure of the sensor S3 or indeed it may be due to a failure or an error of calculation in calculation means. Such a calculation failure may in particular be detected by a "watchdog" type computer system, which may advantageously be integrated in the various calculation means N1, N2, N3.

Advantageously, the sensors S1, S2, S3 may be formed respectively by at least three inertial units.

In other words, the sensors S1, S2, S3 may serve to measure the attitudes, the speeds, and the accelerations of an aircraft relative to at least one axis of rotation about which the aircraft can turn. These axes of rotation are also selected from among the three axes constituted by a pitching axis, a roll axis, and a yaw axis.

In an advantageous embodiment of the invention, the sensors S1, S2, S3 together with respective ones of the at least three calculation means N1, N2, N3 may form at least three mutually distinct monolithic assemblies E1, E2, E3.

In other words, each inertial unit may form a common monolithic assembly with one of the calculation means N1, N2, N3 generating at least one of the control laws L1, L2, or L3.

Furthermore, the present invention also provides an aircraft including at least one actuator for controlling the aircraft. According to the invention, such an aircraft is then remarkable in that it includes at least one control system as described above for controlling the actuator(s).

Thus, in the invention, such an aircraft includes:

at least two mutually distinct sensors S1, S2 suitable for taking mutually distinct measurements P1, P2 of at least one flight parameter of the aircraft;

at least two mutually distinct calculation means N1, N2 suitable for generating at least two mutually distinct control laws L1, L2 for controlling the actuator(s), the control laws L1, L2 being functions of the respective measurements P1, P2;

at least one sequential control device for controlling the actuator(s) with a first control law L1 generated by first calculation means N1 in alternation with a second control law L2 generated by second calculation means N2; and at least two regulation loops B1, B2 for controlling the actuator(s), a first regulation loop B1 implementing the first control law L1 and a second regulation loop B2 implementing the second control law L2, the first regulation loop B1 being closed sequentially while the second regulation loop B2 is open, and conversely the first regulation loop B1 being open sequentially while the second regulation loop B2 is closed.

BRIEF DESCRIPTION OF THE DRAWINGS

The invention and its advantages appear in greater detail in the context of the following description of examples given by way of illustration and with reference to the accompanying figures, in which.

Elements shown in more than one of the figures are given the same references in each of them.

DETAILED DESCRIPTION OF THE INVENTION

As mentioned above, the invention refers to the field of aircraft and of systems for controlling actuators that enable such aircraft to be controlled.

Figure 1:
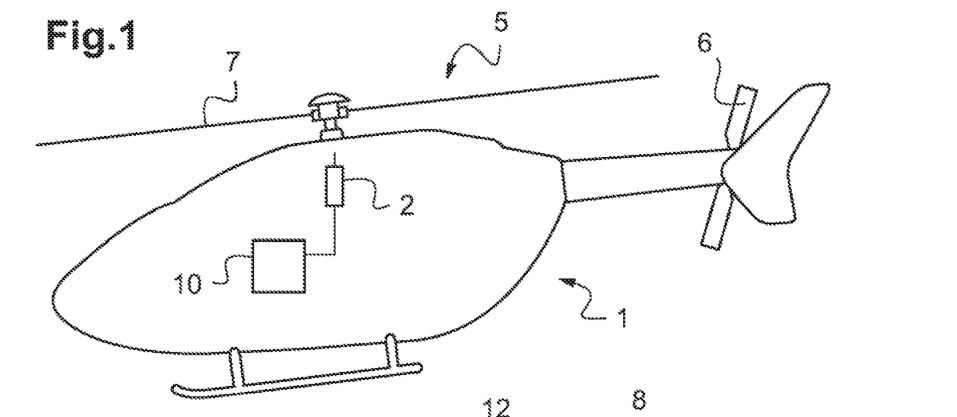
FIG. 1 is a side view of a first example of an aircraft in accordance with the invention.

As shown in FIG. 1, in a first embodiment, the aircraft 1 may be in the form of a rotorcraft having in particular a main rotor 5 and a tail rotor 6. In addition, such an aircraft 1 also has a control system 10 for controlling at least one actuator 2 that may be formed by a hydraulic jack or indeed by a servo-control.

By way of example, such an actuator 2 then serves to move a control swashplate in order to modify the pitch of the blades 7 of the main rotor 5 in collective or cyclic manner. Controlling the actuator(s) 2 thus enables a pilot, or an autopilot, to modify the path of the aircraft 1 specifically along three main axes constituted by the roll axis, the pitching axis, and the yaw axis of the rotorcraft.

Furthermore, the pilot of the rotorcraft may be located inside the aircraft 1, but could equally well be piloting the aircraft remotely using wireless communication means for transmitting control setpoints to the control system of the aircraft 1.

Figures 2, 3:
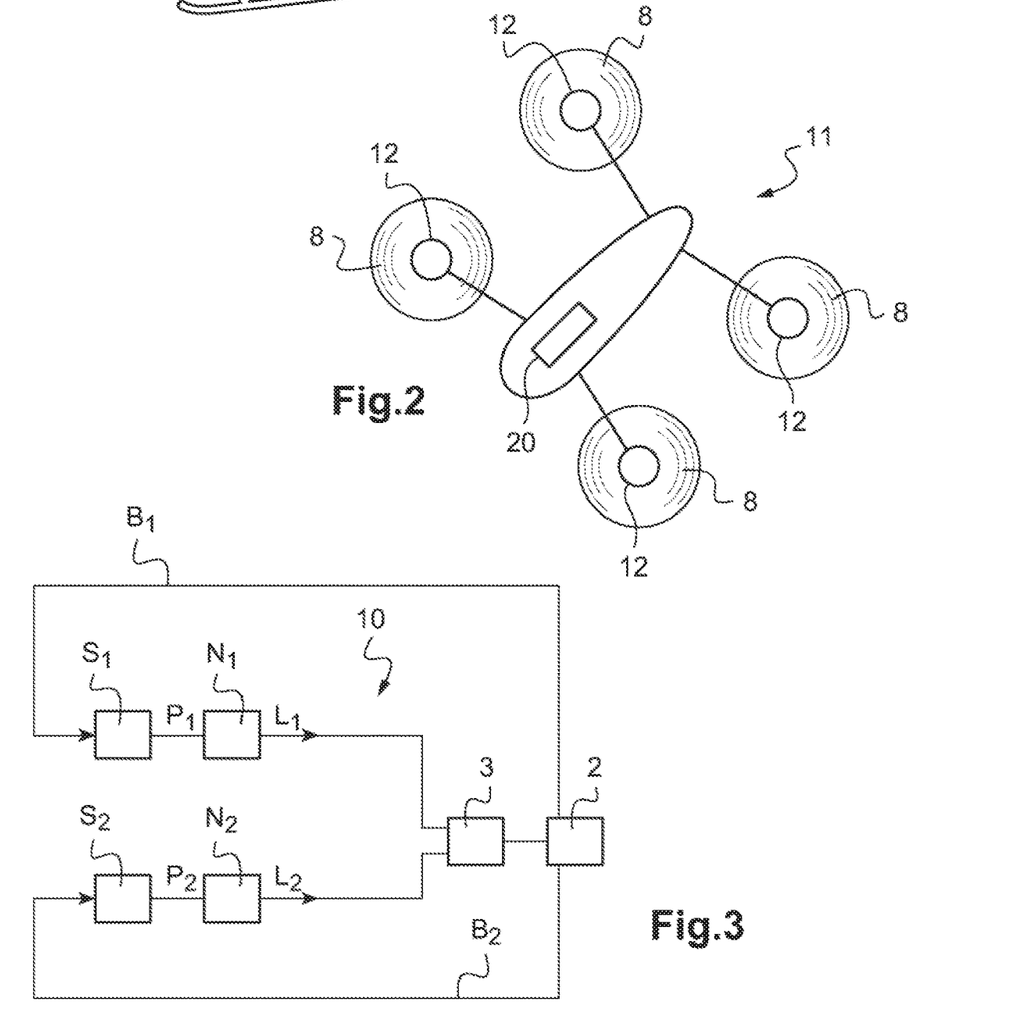
FIG. 2 is a diagrammatic perspective view of a second example of an aircraft in accordance with the invention.
FIGS. 3 to 5 are block diagrams of three variant control systems in accordance with the invention.

In a second embodiment, as shown in FIG. 2, the aircraft 11 may equally well be in the form of a multirotor type drone having a plurality of rotors 8 that are juxtaposed beside one another and that have axes of rotation that are substantially mutually parallel. Actuators 12 connected to a control system 20 can then be formed by four electric motors, each suitable for driving a respective one of the rotors 8 directly in rotation.

As shown in FIG. 3, a first variant of the control system 10 may have two sensors S1 and S2 that do not coincide, serving to take mutual distinct measurements P1 and P2 of at least one flight parameter of the aircraft 1. As mentioned above, such flight parameters may in particular be attitudes, speeds, and/or accelerations of the aircraft 1 along the three main axes.

Furthermore, the control system 10 also has two calculation means N1 and N2 that do not coincide, serving to generate two mutually distinct control laws L1 and L2 for providing control in redundant manner for one or more actuators 2. In addition, these two control laws L1 and L2 are functions of the measurements P1 and P2 respectively of the flight parameter(s) of the aircraft 1.

As shown, the control system 10 has a sequential control device 3 enabling the actuator(s) 2 to be controlled with a first control law L1 generated by the first calculation means N1, and in alternation with a second control law L2 generated by the second calculation means N2.

In addition, the control system 10 also has two regulation loops B1 and B2 for controlling the actuator(s) 2, a first regulation loop B1 implementing the first control law L1 and a second regulation loop B2 implementing the second control law L2, the first regulation loop B1 being closed sequentially when the second regulation loop B2 is open and conversely the first regulation loop B1 being open sequentially when the second regulation loop B2 is closed.

Figure 4:
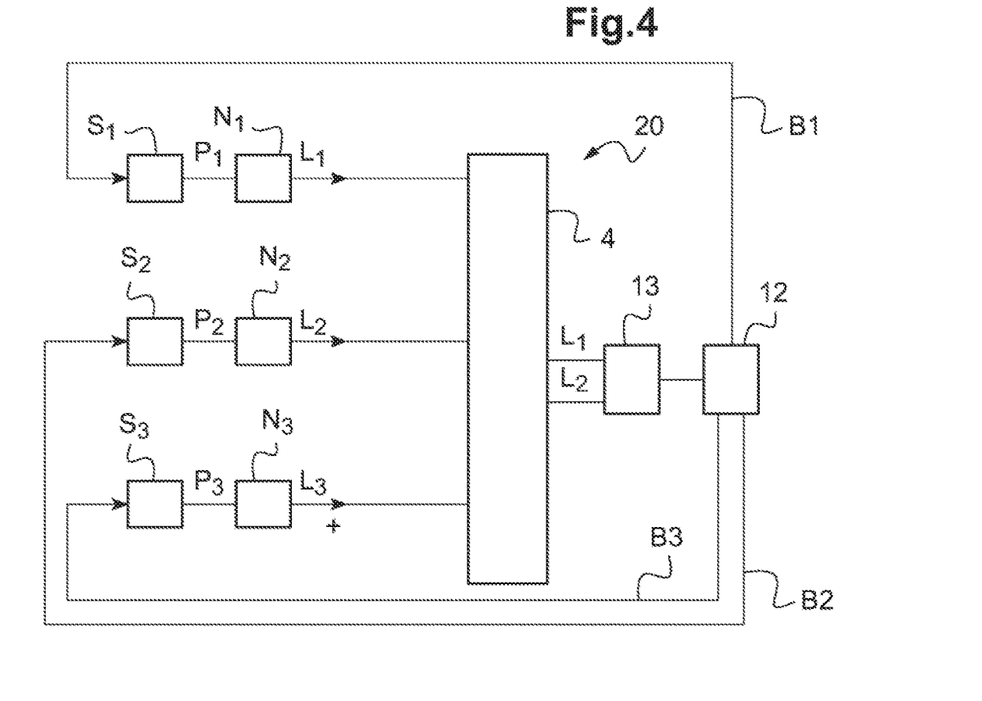

As shown in FIG. 4, a second variant of a control system 20 may have three sensors S1, S2, and S3 serving to take three mutually distinct measurements P1, P2, and P3 of at least one flight parameter of the aircraft 1.

Under such circumstances, the control system 20 also has three calculation means N1, N2, and N3 that do not coincide, serving to generate three mutually distinct control laws L1, L2, and L3 for controlling one or more actuators 12 in redundant manner.

Furthermore, the control system 20 also has a selector device 4 for selecting at least two control laws L1, L2 from among the three control laws L1, L2, and L3. Thus, the sequential control device 13 can control the actuator(s) 12 sequentially with the first control law L1 in alternation with the second control law L2. The selector device 4 serves specifically to exclude, at least temporarily, the third control law L3 from sequentially controlling the actuator(s) 12.

Figure 5:
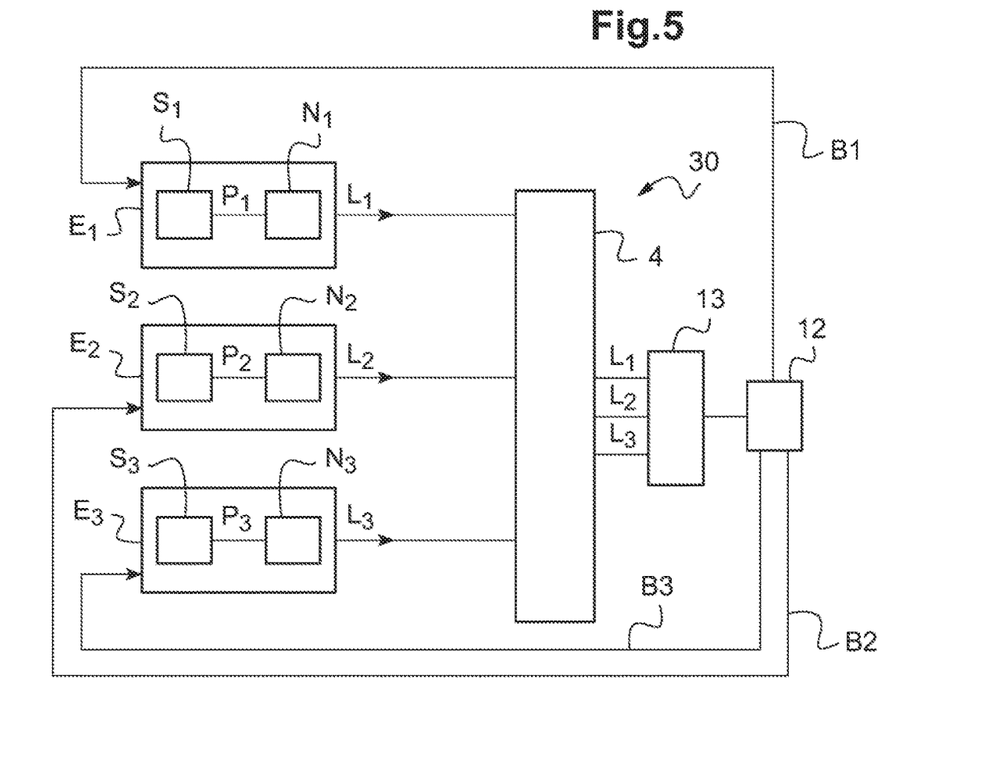

As shown in FIG. 5, a third variant of a sequential control system 30 may have three sensors S1, S2, and S3 serving to take three measurements P1, P2, and P3 together with three calculation means N1, N2, and N3 that do not coincide, serving to generate three control laws L1, L2, and L3 for controlling the actuator(s) 12 in redundant manner.

By way of example, under such circumstances, the three sensors S1, S2, and S3 may be formed by inertial units, and together with the three respective calculation means N1, N2, and N3 they may form at least three mutually distinct monolithic assemblies E1, E2, and E3. Each monolithic assembly E1, E2, or E3 is thus suitable for generating a respective one of the three control laws L1, L2, and L3.

In this configuration, the selector device 4 serves to select one of the three control laws L1, L2, L3 from the three control laws L1, L2, and L3 so long as no failure or error is detected in the measurements taken by the three sensors S1, S2, and S3 or in the calculations performed by the three calculation means N1, N2, and N3.

As mentioned above, the invention also relates to a method of controlling at least one actuator 2, 12 for controlling an aircraft 1, 11. Several implementations of the invention are thus shown in FIGS. 6 to 9.

Figures 6, 7, 8:
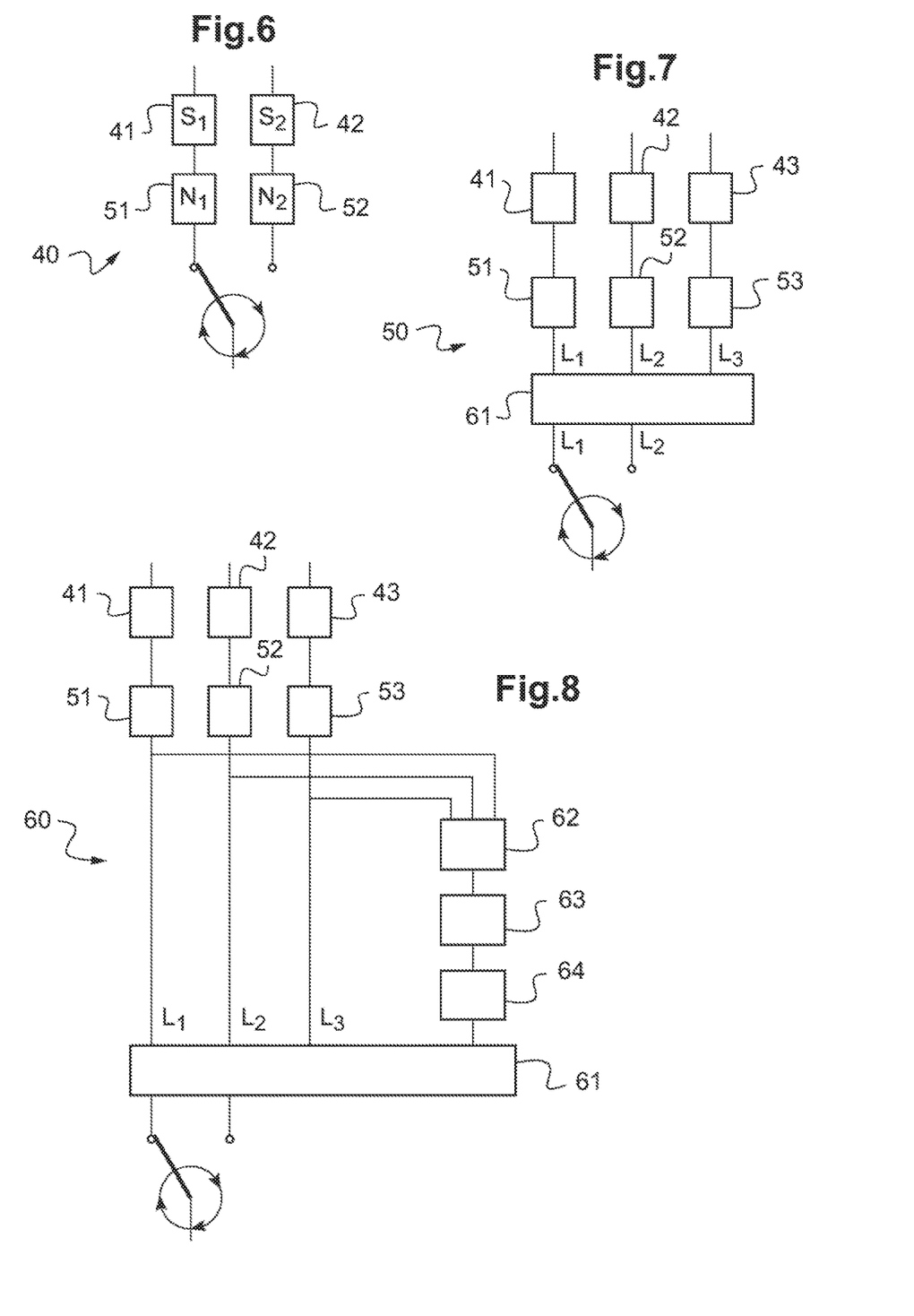
FIGS. 6 to 9 are logic diagrams showing four implementations of a control method in accordance with the invention.

Thus, in a first implementation, as shown in FIG. 6, the control method 40 has two data acquisition steps 41, 42 performed in parallel using two sensors S1 and S2 that do not coincide in order to take redundant measurements P1 and P2 of the flight parameter(s) of the aircraft 1, 11.

The control method 40 then has two calculation steps 51 and 52 for generating in parallel the two mutually distinct control laws L1, L2 for controlling the actuator(s) 2, 12.

Furthermore, such a control method 40 then controls the actuator(s) 2, 12 sequentially with the first control law L1 and in alternation with the second control law L2. In addition, such a control method 40 has two regulation loops B1 and B2 for controlling the actuator(s) 2, 12, a first regulation loop B1 implementing the first control law L1 and a second regulation loop B2 implementing the second control law L2.

Thus, the first regulation loop B1 is closed sequentially while the second regulation loop B2 is open, and conversely the first regulation loop B1 is open sequentially while the first regulation loop B2 is closed.

In a second implementation as shown in FIG. 7, the control method 50 has three data acquisition steps 41, 42, 43 that are performed in parallel via three distinct sensors S1, S2, and S3. Thereafter, the control method 50 has three calculation steps 51, 52, and 53 for generating three mutually distinct control laws L1, L2, and L3 in order to control the actuator(s) 2, 12.

The control method 50 then includes a first selection step 61 for selecting at least two control laws L1, L2 from among the three control laws L1, L2, and L3. Such a method 50 can then control the actuator(s) 2, 12 in sequential manner with the first control law L1 in alternation with the second control law L2, while the third control law L3 is excluded from the sequential control of the actuator(s) 2, 12.

In a third implementation as shown in FIG. 8, the control method 60 may include in parallel a first calculation step 62 serving to calculate a first mean value M1 of a control setpoint. Such a first mean value M1 is calculated as being the arithmetic mean of three control setpoints C1, C2, and C3 generated simultaneously in parallel by the three control laws L1, L2, and L3 for controlling the actuator(s) 2, 12.

Furthermore, the control method 60 then includes a second calculation step 63 for calculating three setpoint differences Δ1, Δ2, and Δ3 that are calculated as being the respective differences between the first mean value M1 and each of three control setpoints C1, C2, and C3. The control method 60 then includes a first comparison step 64 for comparing the three setpoint differences Δ1, Δ2, and Δ3 respectively with a first predetermined threshold value V1.

The first selection step 61 can then select two control laws L1, L2 from among the three control laws L1, L2, and L3 as a function of the results obtained in the first comparison step 64. The two control laws L1, L2 may be selected if the two setpoint differences Δ1 and Δ2 are both less than the first predetermined threshold value V1.

Figure 9:
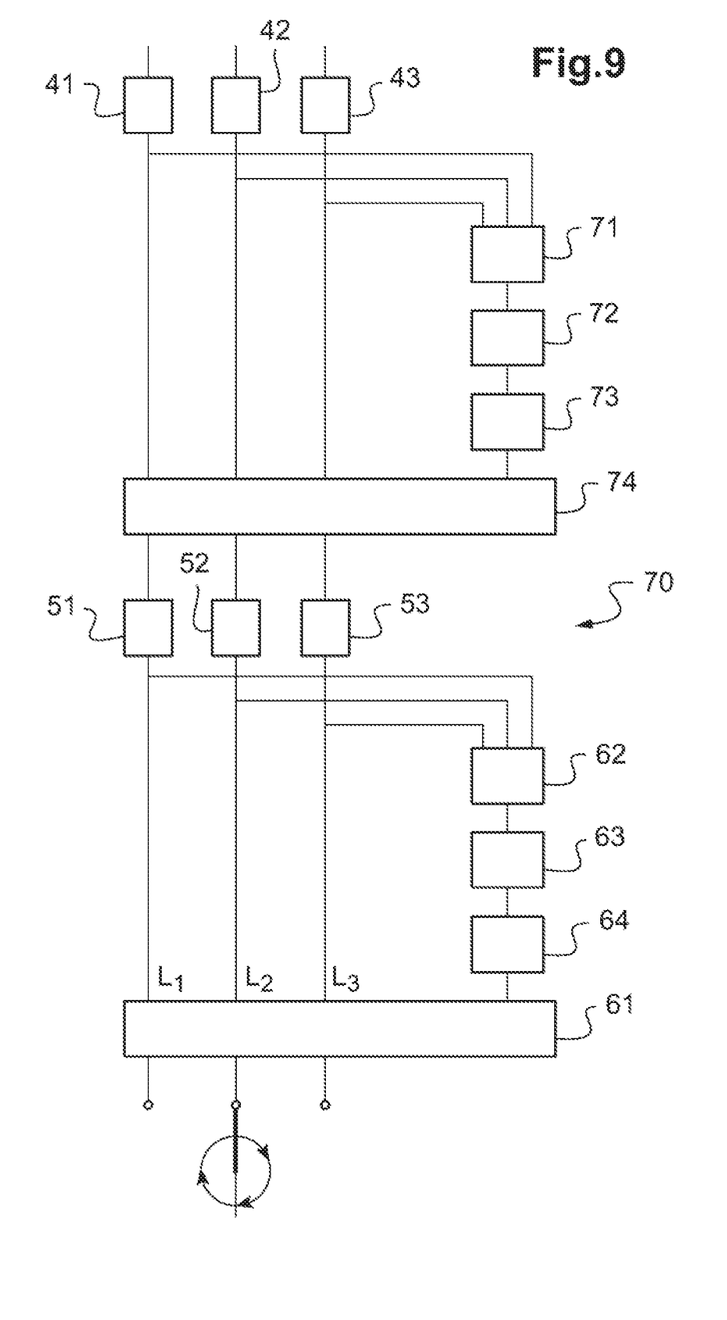

In a fourth implementation as shown in FIG. 9, the control method 70 also has a third calculation step 71 for calculating a second mean value M2 of the measurements P1, P2, and P3.

As above, such a control method 70 then includes a fourth calculation step 72 for calculating at least three measurement differences δ1, δ2, and δ3 calculated as being the respective differences between the second mean value M2 and each of the measurements P1, P2, and P3. Furthermore, the control method 70 includes a second comparison step 73 for comparing the three measurement differences δ1, δ2, and δ3 respectively with a second predetermined threshold value V2.

Finally, the control method 70 has a second selection step 74 for selecting at least two sensors S1, S2 from among the three sensors S1, S2, and S3 respectively as a function of the results obtained in the second comparison step 73 between the three measurement differences δ1, δ2, and δ3 and the second predetermined threshold value V2.

In addition, the sensors S1, S2 may be selected in the selection step 74 if the two measurement differences δ1, δ2 are both less than the second predetermined threshold value V2.

Naturally, the present invention may be subjected to numerous variations as to its implementation. Although several embodiments and implementations are described, it will readily be understood that it is not conceivable to identify exhaustively all possible implementations and embodiments. It is naturally possible to envisage replacing any of the means described by equivalent means without going beyond the ambit of the present invention.

What is claimed is:

1. A method of controlling at least one actuator for controlling an aircraft, the method comprising:
   taking, using mutually distinct first and second sensors (S1, S2), mutually distinct first and second measurements (P1, P2) of at least one flight parameter of the aircraft;
   generating, by mutually distinct first and second calculation means (N1, N2), mutually distinct first and second control laws (L1, L2) for controlling the actuator(s), the first and second control laws (L1, L2) respectively being functions of the first and second measurements (P1, P2);
   controlling, by a control device, the actuator(s) sequentially with the first control law (L1) in alternation with the second control law (L2);
   wherein the first sensor (S1), the first calculation means (N1), and the control device are arranged in a first regulation loop (B1) implementing the first control law (L1) and the second sensor (S2), the second calculation means (N2), and the control device are arranged in a second regulation loop (B2) implementing the second control law (L2); and
   wherein controlling, by the control device, the actuator(s) sequentially with the first control law (L1) in alternation with the second control law (L2) includes (i) closing the first regulation loop (B1) while opening the second regulation loop (B2) whereby the actuator(s) is controlled with the first control law (L1) while the first and second sensors (S1, S2) take the respective measurements (P1, P2) and (ii) opening the first regulation loop (B1) while closing the second regulation loop (B2) whereby the actuator(s) is controlled with the second control law (L2) while the first and second sensors (S1, S2) take the respective measurements (P1, P2).

2. The method according to claim 1, further comprising:
   taking, using a third sensor (S3) distinct from the first and second sensors (S1, S2), a third measurement (P3) of the at least one flight parameter of the aircraft;
   generating, by a third calculation means (N3) distinct from the first and second calculation means (N1, N2), a third control law (L3) for controlling the actuator(s), the third control law (P3) being a function of the third measurement (P3);
   selecting, by a selector device, the first and second control laws (L1, L2) from among the three control laws (L1, L2, L3); and
   wherein controlling, by the control device, the actuator(s) sequentially with the first control law (L1) in alternation with the second control law (L2) includes excluding the third control law (L3) that is a function of the third measurement (P3) of the at least one flight parameter of the aircraft from the sequential control of the actuator(s).

3. The method according to claim 2, further comprising:
   simultaneously generating, by the first, second, and third calculation means (N1, N2, N3), first, second, and third control setpoints (C1, C2, C3) for controlling the actuator(s) from the first, second, and third control laws (L1, L2, L3) respectively;

performing by at least one of the calculation means (N1, N2, N3) the following steps:
- a first calculation step for calculating a first mean control setpoint value (M1), the first mean value (M1) being calculated by taking an arithmetic mean of the control setpoints (C1, C2, C3);
- a second calculation step for calculating at least three setpoint differences (Δ1, Δ2, Δ3), the setpoint differences (Δ1, Δ2, Δ3) being calculated as being the difference between the mean value (M1) and the control setpoints (C1, C2, C3) respectively; and
- a first comparison step for comparing the setpoint differences (Δ1, Δ2, Δ3) respectively with a first predetermined threshold value (V1); and wherein selecting, by the selector device, the first and second control laws (L1, L2) from among the three control laws (L1, L2, L3) is a function of the results obtained from the first comparison step between the setpoint differences (Δ1, Δ2, Δ3) and the first predetermined threshold value (V1), the first and second control laws (L1, L2) being selected by the selector device as the setpoint differences (Δ1, Δ2) are both less than the first predetermined threshold value (V1).

4. The method according to claim 2, further comprising: performing by at least one of the calculation means (N1, N2, N3) the following steps:
- a third calculation step for calculating a second mean value (M2) of the measurements of at least one flight parameter of the aircraft, the second mean value (M2) being calculated by taking an arithmetic mean of the measurements (P1, P2, P3);
- a fourth calculation step for calculating at least three measurement differences (δ1, δ2, δ3), the measurement differences (δ1, δ2, δ3) being calculated as being the difference between the second mean value (M2) and the measurements (P1, P2, P3) respectively;
- a second comparison step for comparing the measurement differences (δ1, δ2, δ3) with a second predetermined threshold value (V2); and selecting, by the selector device, at least two sensors from among the three sensors (S1, S2, S3) as a function of the respective results obtained in the second comparison step between the measurement differences (δ1, δ2, δ3) and the second predetermined threshold value (V2), the first and second sensors (S1, S2) being selected if the measurement differences (δ1, δ2) are both less than the second predetermined threshold value (V2).

5. The method according to claim 1, wherein controlling, by the control device, the actuator(s) sequentially with the first control law (L1) in alternation with the second control law (L2) includes controlling the actuator(s) with the first control law (L1) for a first predetermined duration (T1) and controlling the actuator(s) with the second control law (L2) for a second predetermined duration (T2).

6. The method according to claim 5, wherein the first predetermined duration (T1) is equal to the second predetermined duration (T2).

7. The method according to claim 5, wherein at least one of the first and second predetermined durations (T1, T2) lies in the range 100 ms to 1 s.

8. The method of claim 1, wherein the aircraft is either a rotorcraft or a drone.

9. A control system for controlling at least one actuator for controlling an aircraft, the system comprising:
- mutually distinct first and second sensors (S1, S2) suitable for taking mutually distinct first and second measurements (P1, P2) of at least one flight parameter of the aircraft;
- mutually distinct first and second calculation means (N1, N2) suitable for generating mutually distinct first and second control laws (L1, L2) for controlling the actuator(s), the first and second control laws (L1, L2) being functions of the respective first and second measurements (P1, P2);
- at least one sequential control device for controlling the actuator(s) sequentially with the first control law (L1) generated by the first calculation means (N1) in alternation with the second control law (L2) generated by the second calculation means (N2); and
- first and second regulation loops (B1, B2) for controlling the actuator(s), the first regulation loop (B1) implementing the first control law (L1) and the second regulation loop (B2) implementing the second control law (L2), the first regulation loop (B1) being closed sequentially while the second regulation loop (B2) is open whereby the sequential control device(s) controls the actuator(s) with the first control law (L1) while the first and second sensors (S1, S2) take the respective measurements (P1, P2), and conversely the first regulation loop (B1) being open sequentially while the second regulation loop (B2) is closed whereby the sequential control device(s) controls the actuator(s) with the second control law (L2) while the first and second sensors (S1, S2) take the respective measurements (P1, P2).

10. The system according to claim 9, further comprising:
- a third sensor (P3) distinct from the first and second sensors (S1, S2) and suitable for taking a third measurement (P3) of the at least one flight parameter of the aircraft;
- a third calculation means (N3) distinct from the first and second calculation means (N1, N2) and suitable for generating a third control law (L3) for controlling the actuator(s), the third control law being a function of the third measurement (P3); and
- at least one selector device for selecting the first and second control laws (L1, L2) from among the control laws (L1, L2, L3); and
- wherein the sequential control device(s) in controlling the actuator(s) sequentially with the first control law (L1) in alternation with the second control law (L2) excludes the third control law (L3) that is a function of the third measurement (P3) of the flight parameter(s) of the aircraft from the sequential control of the actuator(s).

11. The system according to claim 9, wherein the sensors are formed respectively by inertial units.

12. The system according to claim 9, wherein the sensors together with respective ones of the calculation means form mutually distinct monolithic assemblies.

13. The system of claim 9, wherein the aircraft is either a rotorcraft or a drone.

14. An aircraft comprising:
- at least one actuator for controlling the aircraft;
- at least one control system for controlling the actuator(s), wherein the at least one control system includes:
  - mutually distinct first and second sensors (S1, S2) suitable for taking mutually distinct first and second measurements (P1, P2) of at least one flight parameter of the aircraft;

mutually distinct first and second calculation means (N1, N2) suitable for generating mutually distinct first and second control laws (L1, L2) for controlling the actuator(s), the first and second control laws (L1, L2) being functions of the respective first and second measurements (P1, P2);

at least one sequential control device for controlling the actuator(s) sequentially with the first control law (L1) generated by the first calculation means (N1) in alternation with the second control law (L2) generated by the second calculation means (N2); and first and second regulation loops (B1, B2) for controlling the actuator(s), the first regulation loop (B1) implementing the first control law (L1) and a the second regulation loop (B2) implementing the second control law (L2), the first regulation loop (B1) being closed sequentially while the second regulation loop (B2) is open whereby the sequential control device(s) controls the actuator(s) with the first control law (L1) while the first and second sensors (S1, S2) take the respective measurements (P1, P2), and conversely the first regulation loop (B1) being open sequentially while the second regulation loop (B2) is closed whereby the sequential control device(s) controls the actuator(s) with the second control law (L2) while the first and second sensors (S1, S2) take the respective measurements (P1, P2).

15. The aircraft of claim 14, wherein the aircraft is either a rotorcraft or a drone.

16. The aircraft of claim 14, wherein:

the at least one control system further includes a third sensor S3)distinct from the first and second sensors (S1, S2) and suitable for taking a third measurement (P3) of the at least one flight parameter of the aircraft;

a third calculation means (N3) distinct from the first and second calculation means (N1, N2) and suitable for generating a third control law (L3) for controlling the actuator(s), the third control law (L3) being a function of the third measurement (P3); and at least one selector device for selecting the first and second control laws (L1, L2)from among the control laws (L1, L2, L3); and wherein the sequential control device(s) in controlling the actuator(s) sequentially with the first control law (L1) in alternation with the second control law (L2) excludes the third control law (L3) that is a function of the third measurement (P3) of the flight parameter(s) of the aircraft from the sequential control of the actuator(s).

17. The aircraft according to claim 14, wherein the sensors are formed respectively by inertial units.

18. The aircraft according to claim 14, wherein the sensors together with respective ones of the calculation means form mutually distinct monolithic assemblies.

* * * * *